May 22, 1934.                H. W. ROTH                1,959,690
ELECTRIC SWITCH CONTROL

Filed June 1, 1931

INVENTOR.
HENRY W. ROTH
BY
Barnes and Kisselle

Patented May 22, 1934

1,959,690

UNITED STATES PATENT OFFICE 1,959,690

ELECTRIC SWITCH CONTROL

Henry W. Roth, Windsor, Ontario, Canada

Application June 1, 1931, Serial No. 541,267

14 Claims. (Cl. 219—4)

This invention has to do with the control of a switch for breaking an electric circuit. More particularly, the invention relates to the automatic breaking of an electric circuit in a machine where electric current is employed for a purpose, and the circuit is automatically broken at or after the time the result for which purpose the electric current is utilized is accomplished.

One environment in which the invention may be employed is that of a welding machine such as, for example, a spot welding machine. The invention is shown and described in such environment herein. It is to be understood that the invention may be incorporated and used in other similar machines and environments. Briefly, the invention has for its primary object automatic discontinuance of the electrical current at or after completion of the weld. In accordance with the invention the circuit breaking apparatus is effective even though the work on which the weld is performed varies in thickness and/or varies as regards resistance to the flow of electricity therethrough, and also when the voltage and amperage varies. In other words, the invention contemplates an apparatus for discontinuing the flow of an electric current at or about the time the weld is completed, notwithstanding the fact that other factors, such as the voltage in the circuit or circuits, and the amperage in the circuit or circuits, and resistance by the work to the flow of electrical current therethrough may vary.

Figure 1:
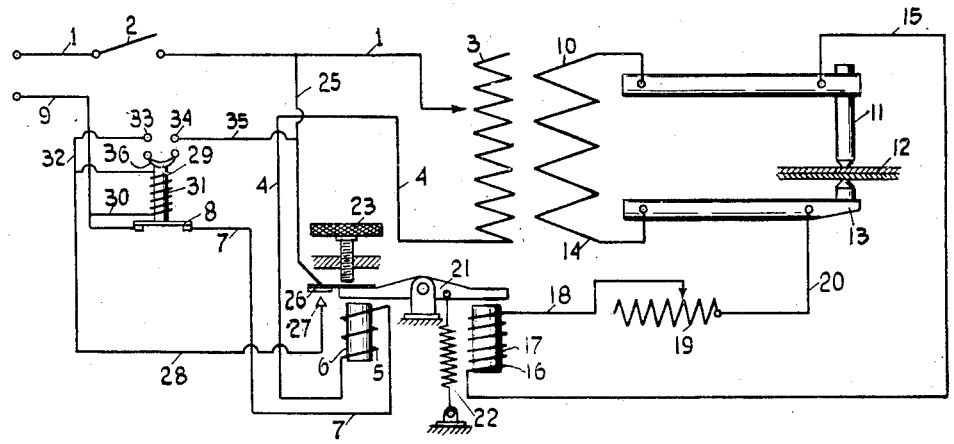
Fig. 1 is a diagrammatic view illustrating electrodes of a spot welding machine, the circuits and the circuit breaking switch devices.

Let us first consider the primary circuit; one line of the primary circuit is shown at 1, equipped with manually controlled switch 2, and this line runs to the primary coil 3 of a transformer which is preferably variable, as illustrated. Wire 4 connects into the other side of the coil 3 and runs to a solenoid 5, preferably surrounding a core 6, continues as at 7 through a normally closed switch or circuit breaker 8 to primary line 9.

The secondary or welding circuit comprises the secondary transformer coil 10 connected to electrode 11, then the circuit during welding operation continues through work 12, to electrode 13 and back into the secondary coil of the transformer through connection 14. A wire 15 is taken off the electrode 11 and it extends through coil 16 preferably with a core 17, and this circuit then continues as at 18 preferably through a variable resistance 19, then by line 20 connects to electrode 13.

A switch device preferably takes the form of a pivoted or balance member 21 positioned to be acted upon by magnetic cores 6 and 17. This member 21 is preferably fairly well balanced but it may be held in normal position by means of a spring 22 holding the arm 21 against an adjustable abutment 23.

A conductor 25 connects into the line 1 to the rear of the switch 2 and it extends to a contact 26 on arm 21. Cooperating with contact 26 is a contact 27, but these are normally out of engagement, and from contact 27 runs a wire 28 to a coil 29, and then by conductor 30 connects back into the primary line 9. The coil 29 is preferably equipped with a core 31 arranged to raise the breaker 8 to break the circuit between wires 7 and 9.

A wire 32 extends from wire 28 to a contact 33 separated from contact 34 from which wire 35 extends and connects into wire 25. A bridge 36 actuatable by the core 31 is arranged to bridge contacts 33 and 34.

In the operation of the machine the switch 2 is a manually controlled switch, and first the operator places the work between the electrodes 11 and 13 and then with the foot or hand closes switch 2. This makes the primary circuit through the transformer, coil 3, conductor 4, magnet coil 5, conductor 7, through breaker 8 back to primary line 9. The primary circuit is alternating current and accordingly, current is induced into the secondary circuit comprising the secondary transformer, coil 10, the two electrodes and the work. Some of the current in the secondary runs through coil 16 by the circuit above described. During the first stages of the welding the magnets comprising cores 6 and 17, and their coils oppose each other, but in such wise that the arm 21 remains balanced. In other words, the magnets 6 and 17 are balanced as regards each other. For balancing the two magnet coils the variable resistance 19 may be employed. It will be understood that the variable resistance 19 need not be changed often as this may be adjusted upon initial installation to balance the two switch controlling coils, and they remain in such adjustment over a long period of time.

Figures 3, 4:
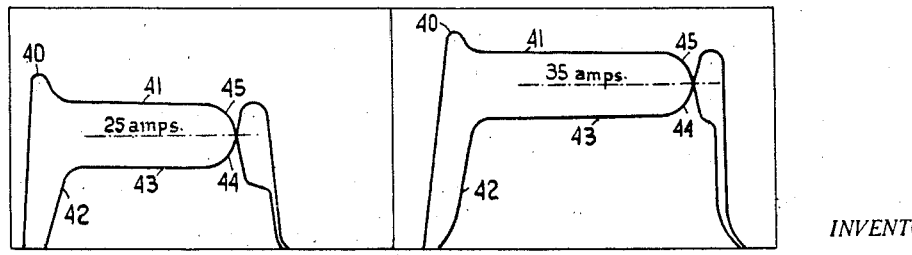
Fig. 3 is a diagrammatic illustration showing the amperage and voltage curves in the secondary or welding circuit.
Fig. 4 is a view similar to Fig. 3 illustrating different voltage and amperage curves which occur under conditions different from the conditions producing the curves shown in Fig. 3.

Referring to Fig. 3, the curves of voltage and amperage in the secondary circuit are shown. When the primary circuit is initially made there is an initial voltage impulse with a sudden rise in voltage to the peak of the curve, as shown at 40, but then the voltage levels off, as illustrated at 41. The amperage rises as at 42 and then the curve levels off, as at 43. As the work is heated and the weld begins to be formed, the resistance offered by the work is lessened when fusion takes place, which results in an increase of amperage in the secondary, as illustrated by the curve at 44. This is accompanied by a decrease in the voltage across the electrodes, as illustrated by the portion 45 of the voltage curve. Accordingly, the two curves approach each other and cross. It is substantially at this period when these curves cross that the weld is completed, and it is at this time that the primary circuit is to be broken automatically by the device of this invention, resulting in the curves dropping as illustrated.

When the amperage increases across the electrodes the voltage across the electrodes decreases with the result that the current which passes through the circuit of coil 16 is reduced due to the reduced voltage thus weakening the action of the coil 16 upon the balance arm 21. This increase of amperage in the secondary is accompanied by an increase in amperage in the primary thus strengthening the action of the magnet coil 5. Thus, substantially, at the time the metals fuse together making a weld, balance arm 21 is tripped to bring contacts 26 and 27 into engagement. When this occurs the coil 29 is energized thus lifting the bridge 28 and breaking the primary circuit between wires 7 and 9. The operator may still have the switch 2 closed, yet the machine has discontinued operation by breaking the primary circuit. However, as soon as the primary circuit is broken the coil 5 is de-energized with the result that contacts 26 and 27 will separate which would, in the absence of other means being provided, de-energize coil 31 and the primary circuit would be again made by the bridge 8. This would result in a rapid making and breaking of the primary circuit. To overcome this, the coil 29, when energized, raises bridge 36 to make the contact between the points 33 and 34; thus, when the primary circuit is broken by the bridge 8 moved by action of coil 29, coil 29 then remains energized by current passing through the wire 35 across bridge 36, into line 32, thence into coil 29 and back to the other side of the primary through wire 30. Accordingly, when the weld is made balance arm 21 is rocked energizing coil 29 which breaks the primary circuit, but coil 29 remains energized, with the primary circuit broken, so long as the operator keeps the switch 2 closed. After this has occurred the operator may open switch 2 thus placing the machine in condition for another weld operation at a different point on the work 12, and as soon as switch 2 is open coil 29 is de-energized and bridge 8 closes the line.

Suppose that this same machine is to be used now with work which is thicker and which requires greater amperage and voltage in the secondary which is ordinarily accomplished by adjusting the variable coils in the primary transformer coil 3. The curves for this are shown in Fig. 4. Note that the curves have the same general shape as shown in Fig. 3 but the amperage is higher and the voltage is higher. Thicker work requires this increased amperage. However, the two coils which function upon the balance arm 21 remain balanced. When the voltage increases in the secondary the strength of the coil 16 is increased. However, the increased amperage in the secondary is accompanied by a corresponding increase in the primary thus strengthening the coil 5. So in this case, notwithstanding these varied factors the balance arm 21 is actuated only when the voltage and amperage curves in the secondary are in the zone of crossing. As diagrammatically illustrated in Fig. 3, this zone of crossing is at about 25 amperes, whereas in Fig. 4 the zone of crossing is at 35 amperes, yet the circuit is broken in both cases at the proper time without requiring any readjustment as the increase of the voltage and the increase of the amperage, as shown in Fig. 4, balance each other and balance the arm 21 and only actuate arm 21 upon sudden increase of amperage accompanied by a decrease of voltage across the welding points. Accordingly, it will be noted that in accordance with this invention the circuits are broken substantially upon the completion of the weld. The circuits are broken at the completion of the weld whether using thin gauge stock requiring relatively low voltage and relatively low amperage, or relatively thick stock requiring higher voltage and higher amperage.

It might be pointed out that if the breaking of the circuits relied only upon one of these factors, that is, the voltage or the amperage, the switch devices would have to be adjusted for every different piece of work, whereas in the present case, voltage and amperage may vary as required for different work, and one offsets the other. Moreover, much better welds are obtained as the circuits are broken just at the right time at the completion of the weld, and it may be so adjusted. In a hand operated machine the operator closes the circuit and the weld begins, and when the operator thinks the weld is satisfactory the circuits are broken. Thus, the different points of weld may vary. Furthermore, it requires considerable skill on the part of the operator. But, with the present invention the circuit is automatically broken at the completion of the weld, so that each weld is uniform and most efficiently accomplished. It is worthy of note that once the installation is properly made, no tinkering or adjustments of the circuit breaking mechanism is necessary when the welding machine is used for different types of work. It might be added that the initial voltage impulse represented by the peak 40 of the curve is merely a very sudden initial condition not sufficient to affect the circuit breaking arrangement.

Figure 2:
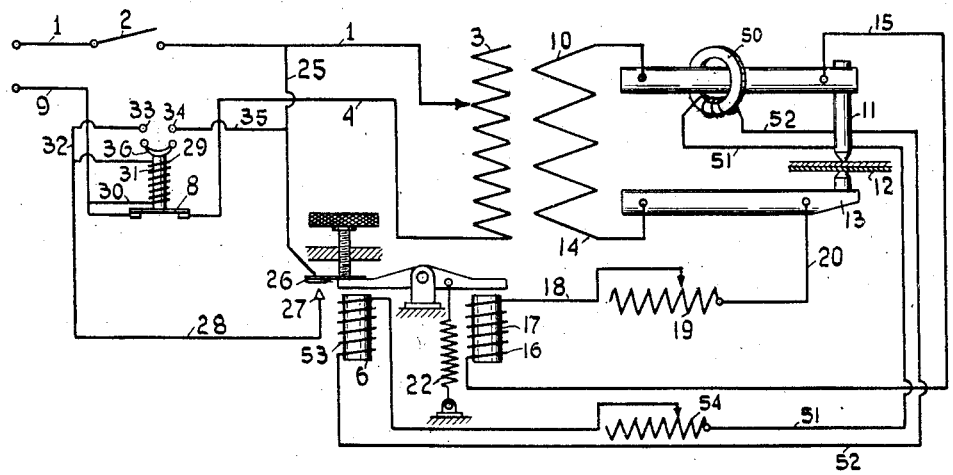
Fig. 2 is a similar view illustrating a modified form of wiring.

The modified arrangement shown in Fig. 2 employs the same general arrangement as that shown in Fig. 1, and accordingly the same reference characters are applied to the same parts. However, in the primary circuit, wire 4 does not extend through a solenoid around core 6 but goes directly back into the side 9 of the primary line through the breaker 8. Instead, a transformer preferably of loose coupler type 50 is associated with the secondary circuit, as for example, the electrode 11, and the secondary circuit of this transformer represented by wires 51 and 52, run through coil 53 around the core 6. A variable resistance for adjustment purposes, as shown at 54, may be associated with this circuit. In this form when the metals fuse together and the weld becomes completed the amperage increases across the electrodes which results in a decrease of voltage in the circuit of coil 16, as above described, thus weakening the action of magnet coil 16 upon the rocker arm 21. Upon increase of the amperage in the secondary circuit, however, the amperage increases in the circuit for coil 53 thus strengthening the same to the end that the balance arm 21 is rocked, the coil 29 energized, the primary circuit broken with the coil 29 remaining energized until the manually controlled switch 2 is opened. The transformer 50 is preferably of the loose coupler type in order not to be materially affected by the initial voltage impulse represented by the peak 40 of voltage curves.

I claim:

1. In a welding machine or the like, the combination of a welding circuit having opposed electrodes therein, means for breaking the welding circuit comprising a movable member, a pair of solenoids adapted when energized to move said member respectively in opposite directions, one solenoid being in a circuit which increases in amperage as the resistance of the welding circuit increases, the other solenoid being in a circuit which decreases in amperage as the resistance of the welding circuit increases, one of said solenoids increasing in strength when the other decreases, whereby to move the movable member and break the welding circuit.

2. In a welding machine or the like, the combination of a welding circuit having opposed electrodes therein, means for breaking the welding circuit comprising a movable member, a pair of solenoids acting upon the movable member, one solenoid being connected across the electrodes, whereby it carries current varying inversely with that flowing between the electrodes, the other solenoid being connected to carry current varying in the same direction as that flowing between the electrodes, one of said solenoids increasing in strength when the current decreases, whereby to move the movable member and break the welding circuit.

3. An apparatus for controlling an electric circuit in an electric welding machine, which comprises a pivoted switch arm normally closing said circuit, a pair of opposing solenoids acting on said switch arm and substantially balanced against each other, the strength of one of which is determined by the voltage across the electrodes, and the strength of the other of which is determined by the amperage in the welding circuit, and which remain balanced irrespective of variations of both voltage and amperage, said solenoids being adapted to open the circuit upon substantial completion of the weld, and accompanying amperage increase between the electrodes and corresponding drop in voltage across the electrodes, by an increase and decrease in the respective strengths of the solenoids.

4. In a welding machine or the like, the combination of opposing electrodes in a circuit, a balance arm, a solenoid in the circuit acting upon the balance arm, another solenoid acting upon the balance arm in opposition to the first, a circuit for the latter solenoid subject to increased amperage upon increase of amperage in the electrode circuit, said first named solenoid being adapted to become weaker upon amperage increase in the electrode circuit accompanied by voltage drop across the electrodes, said second named solenoid becoming stronger incident to the amperage increase in the electrode circuit whereby to actuate the balance arm, and means operable by movement of said balance arm for controlling flow of current through the electrode circuit.

5. In a welding machine or the like, the combination of opposing electrodes in a circuit, a balance arm, a solenoid in the circuit acting upon the balance arm, another solenoid acting upon the balance arm in opposition to the first, a circuit for the latter solenoid subject to increased amperage upon increase of amperage in the electrode circuit, said first named solenoid being adapted to become weaker upon amperage increase in the electrode circuit accompanied by voltage drop across the electrodes, said second named solenoid becoming stronger incident to the amperage increase in the electrode circuit whereby to actuate the balance arm, a circuit having spaced contacts, said contacts being engaged upon actuation of the balance arm, a solenoid in this last named circuit, and means actuated by the last named solenoid for breaking the electrode circuit.

6. In a welding machine or the like, the combination of opposing electrodes, a circuit therefor, a balance arm, a solenoid in the circuit acting upon the balance arm, another solenoid acting upon the balance arm in opposition to the first, a circuit for the latter solenoid subject to increased amperage upon increase of amperage in the electrode circuit, said first named solenoid being adapted to become weaker upon amperage increase in the electrode circuit accompanied by voltage drop across the electrodes, said second named solenoid becoming stronger incident to the amperage increase in the electrode circuit whereby to actuate the balance arm, a circuit having spaced contacts, said contacts being engaged upon actuation of the balance arm, a solenoid in this last named circuit, means actuated by the last named solenoid for breaking the electrode circuit, and means also actuated by the last named solenoid for closing a circuit to maintain the last named solenoid energized upon breaking of the electrode circuit.

7. In a welding machine or the like, the combination of a primary circuit, a secondary circuit including welding electrodes, means for breaking the primary circuit comprising a solenoid, a normally open circuit containing said solenoid, a balance arm movable to close the solenoid circuit, two solenoids acting upon the balance arm and adapted to balance the same in circuit open position, one of which is energized by a circuit across the electrodes, and the other of which is energized by the primary circuit, one of said solenoids becoming weaker and the other stronger as the amperage in the secondary circuit increases due to weld completion whereby to actuate the balance arm and make the circuit for the first mentioned solenoid to break the primary circuit.

8. In a welding machine or the like, the combination of a primary circuit, a secondary circuit including welding electrodes, means for breaking the primary circuit comprising a solenoid, a normally open circuit containing said solenoid, a balance arm movable to close the solenoid circuit, two solenoids acting upon the balance arm and adapted to balance the same in circuit open position, one of which is energized by a circuit across the electrodes, and the other of which is energized by the primary circuit, one of said solenoids becoming weaker and the other stronger as the amperage in the secondary circuit increases due to weld completion whereby to actuate the balance arm and make the circuit for the first mentioned solenoid to break the primary circuit, and another circuit for the first mentioned solenoid which is made by the action of said solenoid whereby the same is maintained energized after the breaking of the primary circuit and while the manually controlled switch is closed.

9. In a welding machine or the like, a primary circuit, a secondary circuit, welding electrodes therein, a switch for breaking the primary circuit, a solenoid for actuating said last named switch, a normally open circuit therefor, a balance arm movable to close said circuit, a pair of solenoids acting in opposition on the balance arm, a circuit for one connected across the electrodes, a circuit for the other connected to carry current varying in the same direction as the current in the secondary circuit whereby one solenoid weakens and the other strengthens upon increase of amperage in the secondary circuit to actuate the rocker arm and close the circuit for the switch operating solenoid.

10. In a welding machine or the like, a primary circuit, a secondary circuit, welding electrodes therein, a switch for breaking the primary circuit, a solenoid for actuating said last named switch, a normally open circuit therefor, a balance arm movable to close said circuit, a pair of solenoids acting in opposition on the balance arm, a circuit for one connected across the electrodes, a circuit for the other comprising a transformer connected to carry current varying in the same direction as the current in the secondary circuit whereby one solenoid weakens and the other strengthens upon increase of amperage in the secondary circuit to actuate the rocker arm and close the circuit for the switch operating solenoid.

11. In a welding machine or the like, a primary circuit, a secondary circuit, welding electrodes therein, a switch for breaking the primary circuit, a solenoid for actuating said last named switch, a normally open circuit therefor, a balance arm movable to close said circuit, a pair of solenoids acting in opposition on the balance arm, a circuit for one connected across the electrodes, a circuit for the other comprising a loose coupler transformer connected to carry current varying in the same direction as the current in the secondary circuit whereby one solenoid weakens and the other strengthens upon increase of amperage in the secondary circuit to actuate the rocker arm and close the circuit for the switch operating solenoid.

12. In a welding machine or the like, a primary circuit, a secondary circuit, welding electrodes therein, a switch for breaking the primary circuit, a solenoid for actuating said last named switch, a normally open circuit therefor, a balance arm movable to close said circuit, a pair of solenoids acting in opposition on the balance arm, a circuit for one connected across the electrodes, a circuit for the other connected to carry current varying in the same direction as the current in the secondary circuit whereby one solenoid weakens and the other strengthens upon increase of amperage in the secondary circuit to actuate the rocker arm and close the circuit for the switch operating solenoid, another circuit for said switch operating solenoid, and means for making said circuit when the primary circuit is broken whereby said solenoid remains energized and holds the primary circuit broken.

13. In a welding machine or the like, a primary circuit, a secondary circuit, welding electrodes therein, a switch for breaking the primary circuit, a solenoid for actuating said last named switch, a normally open circuit therefor, a balance arm movable to close said circuit, a pair of solenoids acting in opposition on the balance arm, a circuit for one connected across the electrodes, a circuit for the other connected to carry current varying in the same direction as the current in the secondary circuit whereby one solenoid weakens and the other strengthens upon increase of amperage in the secondary circuit to actuate the rocker arm and close the circuit for the switch operating solenoid, another circuit for said switch operating solenoid, and means for making said circuit when the primary circuit is broken whereby said solenoid remains energized and holds the primary circuit broken, said last named solenoid being de-energized upon the opening of the manually controlled switch.

14. In a welding machine or the like, the combination of a welding circuit having opposed electrodes therein, means for breaking the welding circuit comprising a movable member, a pair of solenoids acting upon the movable member, one solenoid being in a circuit which decreases in amperage upon voltage drop across the electrodes, the other solenoid being in a circuit which increases in amperage upon increase of amperage in the welding circuit, one of said solenoids increasing in strength when the other decreases whereby to move the movable member and break the welding circuit.

HENRY W. ROTH.